United States Patent
Bai

(10) Patent No.: US 11,909,065 B2
(45) Date of Patent: Feb. 20, 2024

(54) COVER PLATE ASSEMBLY, BATTERY CELL, BATTERY MODULE, BATTERY PACK, AND APPARATUS

(71) Applicant: CONTEMPORARY AMPEREX TECHNOLOGY CO., LIMITED, Ningde (CN)

(72) Inventor: Lulu Bai, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 168 days.

(21) Appl. No.: 17/552,566

(22) Filed: Dec. 16, 2021

(65) Prior Publication Data
US 2022/0109212 A1 Apr. 7, 2022

Related U.S. Application Data

(63) Continuation of application No. PCT/CN2020/134129, filed on Dec. 5, 2020.

(30) Foreign Application Priority Data

Dec. 26, 2019 (CN) .......................... 201922387308.7

(51) Int. Cl.
*H01M 50/342* (2021.01)
*H01M 50/15* (2021.01)
(Continued)

(52) U.S. Cl.
CPC ....... *H01M 50/3425* (2021.01); *H01M 50/15* (2021.01); *H01M 50/143* (2021.01);
(Continued)

(58) Field of Classification Search
CPC .......... H01M 2220/20; H01M 50/143; H01M 50/15; H01M 50/164; H01M 50/209;
(Continued)

(56) References Cited

U.S. PATENT DOCUMENTS

2018/0261806 A1* 9/2018 Kawate ............... H01M 50/474
2022/0059902 A1 2/2022 Jiang et al.

FOREIGN PATENT DOCUMENTS

| CN | 207925531 U | 9/2018 |
| CN | 208570682 U | 3/2019 |

(Continued)

OTHER PUBLICATIONS

CN109786644A Machine translation (Year: 2023).*
(Continued)

*Primary Examiner* — Lingwen R Zeng
(74) *Attorney, Agent, or Firm* — Scully, Scott, Murphy & Presser, P.C.

(57) ABSTRACT

A cover plate assembly, a battery cell, a battery module, a battery pack and an apparatus are disclosed. The cover plate assembly includes a top cover plate, where the top cover plate is provided with an explosion-proof valve; and an insulating plate, laminated with the top cover plate, where the insulating plate includes a base portion and a thinned region located on the base portion, the thinned region is formed by thinning the base portion, and a region enclosed by boundaries of an orthographic projection of the thinned region at least partially overlaps an orthographic projection of the explosion-proof valve in a thickness direction of the cover plate assembly. The thinned region is formed by thinning the base portion.

9 Claims, 6 Drawing Sheets

(51) Int. Cl.
  *H01M 50/143* (2021.01)
  *H01M 50/164* (2021.01)
  *H01M 50/55* (2021.01)
  *H01M 50/249* (2021.01)
  *H01M 50/209* (2021.01)

(52) U.S. Cl.
  CPC ........ *H01M 50/164* (2021.01); *H01M 50/209* (2021.01); *H01M 50/249* (2021.01); *H01M 50/55* (2021.01); *H01M 2220/20* (2013.01); *Y02E 60/10* (2013.01)

(58) Field of Classification Search
  CPC ........... H01M 50/249; H01M 50/3425; H01M 50/55; Y02E 60/10
  See application file for complete search history.

(56) References Cited

FOREIGN PATENT DOCUMENTS

| | | |
|---|---|---|
| CN | 109768189 A | 5/2019 |
| CN | 109786644 A | 5/2019 |
| CN | 209056523 U | 7/2019 |
| CN | 209104230 U | 7/2019 |
| CN | 106328857 B | 10/2019 |
| CN | 209626267 U | 11/2019 |
| CN | 211017216 U | 7/2020 |
| JP | 2001102024 A | 4/2001 |
| JP | 2009087727 A | 4/2009 |
| JP | 2013025882 A | 2/2013 |
| JP | 2014130801 A | 7/2014 |

OTHER PUBLICATIONS

International Search Report dated Feb. 25, 2021 issued in PCT/CN2020/134129.
Extended European Search Report dated May 17, 2022 received in European Patent Application No. EP 20906414.6.
Notice of Preliminary Rejection dated Jun. 1, 2023 received in Korean Patent Application No. KR 10-2022-7015879.
Notice of reasons for Refusal dated Jun. 26, 2023 received in Japanese Patent Application No. 2022-530962.

* cited by examiner

COVER PLATE ASSEMBLY, BATTERY CELL, BATTERY MODULE, BATTERY PACK, AND APPARATUS

CROSS-REFERENCE TO RELATED APPLICATIONS

This application is a continuation of International Application No. PCT/CN2020/134129, filed on Dec. 5, 2020, which claims priority to Chinese Patent Application No. 201922387308.7, filed on Dec. 26, 2019. The disclosures of the aforementioned applications are hereby incorporated by reference in their entireties.

TECHNICAL FIELD

Implementations of this application relate to the field of energy storage devices, and in particular, to a cover plate assembly, a battery cell, a battery module, a battery pack, and an apparatus.

BACKGROUND

With the continuous development of new energy technologies, especially new energy batteries, people have increasingly high requirements for safety performance of new energy batteries.

At present, a battery cell of the new energy battery typically includes a housing, an electrode unit located in the housing, and a top cover assembly covering an opening of the housing. The top cover assembly typically includes a top cover plate and an insulating plate located on a side of the top cover plate facing toward the electrode unit. In order to improve safety performance of the battery cell, the top cover plate is typically provided with an explosion-proof valve. When pressure inside the housing reaches a pressure threshold, the explosion-proof valve is pushed open to release the pressure. If the explosion-proof valve cannot be opened normally, the battery cell may explode.

Therefore, a new cover plate assembly, battery cell, battery module, battery pack, and apparatus are urgently needed.

SUMMARY

Embodiments of this application provide a cover plate assembly, a battery cell, a battery module, a battery pack, and an apparatus, to improve safety performance of battery cells.

According to one aspect, an embodiment of this application provides a cover plate assembly for a battery cell. The cover plate assembly includes: a top cover plate, where the top cover plate is provided with an explosion-proof valve; and an insulating plate, laminated with the top cover plate, where the insulating plate includes a base portion and a thinned region located on the base portion, the thinned region is formed by thinning the base portion, and a region enclosed by boundaries of an orthographic projection of the thinned region at least partially overlaps an orthographic projection of the explosion-proof valve in a thickness direction of the cover plate assembly.

Therefore, the foregoing solution can effectively increase an exhaust area and ensure normal and timely opening of the explosion-proof valve. The region enclosed by the boundaries of the orthographic projection of the thinned region at least partially overlaps the orthographic projection of the explosion-proof valve in the thickness direction of the cover plate assembly, which means the thinned region corresponds to a position of the explosion-proof valve in the thickness direction, so that gas can quickly arrive at the explosion-proof valve and then quickly push the explosion-proof valve open, avoiding explosion caused by the explosion-proof valve failing to be opened, and effectively improving safety performance of the battery cells.

According to one aspect of this application, the insulating plate includes two surfaces disposed opposite each other in the thickness direction, and the thinned region includes a groove formed by at least one of the two surfaces being recessed.

According to one aspect of this application, the insulating plate includes a recess portion, where the recess portion is formed by the base portion being recessed in a direction away from the top cover plate, and is disposed corresponding to the explosion-proof valve in the thickness direction; and the groove is disposed on the periphery of the recess portion. The foregoing solution can further increase the exhaust area and increase the rate of pressure relief for the battery cells, thereby ensuring the safety performance of the battery cells.

According to one aspect of this application, the area of the orthographic projection of the recess portion is greater than or equal to the area of the orthographic projection of the explosion-proof valve in the thickness direction.

According to one aspect of this application, the groove is formed by extending around an outer circumference of the recess portion; or the groove includes more than two sub-grooves which are spaced apart along an outer circumference of the recess portion.

According to one aspect of this application, a shape of the recess portion matches a shape of the explosion-proof valve.

According to one aspect of this application, the recess portion includes a first arc-shaped outer edge; and the groove is formed by the first arc-shaped outer edge extending along a direction away from the recess portion, a second arc-shaped outer edge is formed on a side of the groove facing away from the recess portion, and the groove is distributed as an arc-shaped strip.

According to another aspect, an embodiment of this application further provides a battery cell, including: a housing and an electrode unit located in the housing, where the foregoing cover plate assembly covers an opening of the housing, and the insulating plate is located on a side of the top cover plate facing toward the electrode unit.

According to still another aspect, an embodiment of this application further provides a battery module, including the foregoing battery cell.

According to yet another aspect, an embodiment of this application further provides a battery pack, including the foregoing battery module.

According to still yet another aspect, an embodiment of this application further provides an apparatus that uses battery cells as a power source, where the battery cells are the foregoing battery cells.

In the cover plate assembly for a battery cell according to the embodiments of this application, the cover plate assembly includes a top cover plate and an insulating plate. The top cover plate is provided with an explosion-proof valve, and a base portion of the insulating plate is provided with a thinned region. The thinned region is formed by thinning the base portion, so that the thinned region is easily softened and deformed by heat, making a through hole in the thinned region, thereby effectively increasing an exhaust area and ensuring normal and timely opening of the explosion-proof valve. The region enclosed by the boundaries of the orthographic projection of the thinned region at least partially overlaps the orthographic projection of the explosion-proof valve in the thickness direction of the cover plate assembly, which means the thinned region corresponds to the position of the explosion-proof valve in the thickness direction, so that gas can quickly arrive at the explosion-proof valve and then quickly push the explosion-proof valve open, avoiding explosion caused by the explosion-proof valve failing to be opened, and effectively improving safety performance of the battery cell.

BRIEF DESCRIPTION OF DRAWINGS

To describe the technical solutions in the embodiments of this application or in the prior art more clearly, the following briefly describes the accompanying drawings for describing the embodiments or the prior art. Apparently, the accompanying drawings in the following description show some embodiments of this application, and a person of ordinary skill in the art may still derive other drawings from these accompanying drawings without creative efforts.

Other features, purposes and advantages of this application will become more apparent by reading the following detailed description of the non-limitative embodiments with reference to the accompanying drawings, where the same or similar reference signs indicate the same or similar features.

Figure 1:
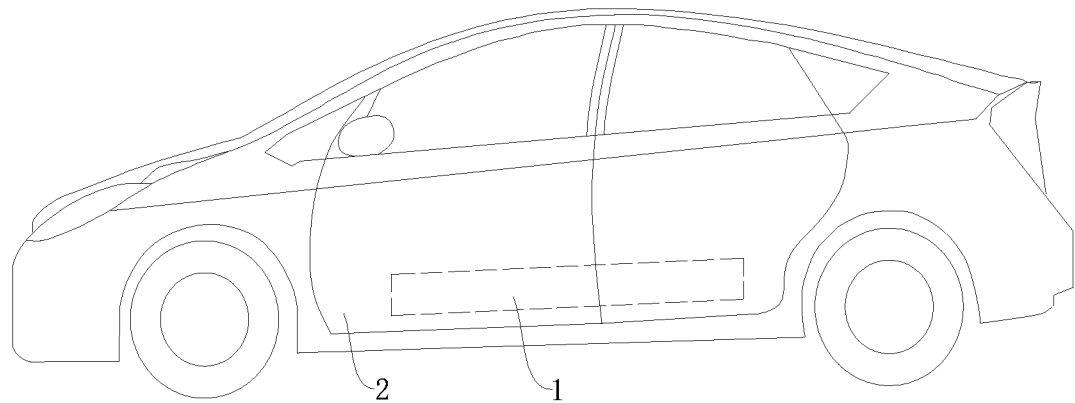
FIG. 1 is a schematic structural diagram of an apparatus using battery cells as a power source according to an embodiment of this application.

Reference signs are described as follows:
1. battery pack; 11. battery module; 12. box body; 2. vehicle body;
10. battery cell; 20. accommodating portion; 21. end plate; 22. side plate;
100. housing;
200. electrode unit; 210. connecting sheet;
300. cover plate assembly; 310. top cover plate; 311. explosion-proof valve; 320. insulating plate; 321. base portion; 322. thinned region; 322a. groove; 322b. second arc-shaped outer edge; 323. recess portion; 323a. first arc-shaped outer edge; 324. exhaust passage; 324a. exhaust through hole;
400. supporting plate;
500. insulating sheet;
600. insulating film;
X. length direction;
Y. width direction; and
Z. thickness direction.

DESCRIPTION OF EMBODIMENTS

The features and example embodiments of various aspects of this application will be described in detail below. In the following detailed description, many specific details are presented for a comprehensive understanding of this application. However, it is obvious to those skilled in the art that this application can be implemented without some of these specific details. The following descriptions of the embodiments are only to provide a better understanding for this application by showing examples of this application. In the accompanying drawings and description below, at least part of certain well-known structures and technologies are not shown in order to avoid unnecessary ambiguity to this application; and the size of some structures may be exaggerated for clarity. In addition, the features, structures or characteristics described below may be combined in one or more embodiments in any suitable manner.

In the descriptions of this application, it should be noted that, unless otherwise specified, "plurality" means more than two; and orientations or position relationships indicated by the terms "up", "down", "left", "right", "inside", "outside", and the like are merely intended to simplify description of this application, rather than indicating or implying that an apparatus or a part must have a particular direction or must be constructed and operated in a particular orientation. Therefore, this shall not be construed as any limitation on this application. In addition, the terms "first" and "second" are merely intended for the purpose of description, and shall not be understood as an indication or implication of relative importance.

The orientation words shown in the following description are all directions shown in the drawings, and are not limited to the specific structure of the embodiments of this application. In the descriptions of this application, it should be further noted that, unless otherwise specified and defined explicitly, the terms "mounted" and "connected" are to be interpreted broadly, for example, may be fixedly connected, or detachably connected, or integrally connected, and may be directly connected, or indirectly connected. A person of ordinary skill in the art can understand specific meanings of these terms in this application based on specific situations.

For better understanding this application, the following describes in detail a cover plate assembly, a battery cell, a battery module, a battery pack, and an apparatus of the embodiments of this application with reference to FIG. 1 to FIG. 11.

As shown in FIG. 1, an embodiment of this application first provides a vehicle. The vehicle includes a vehicle body 2 and a battery pack 1, and the battery pack 1 is disposed in the vehicle body 2.

The vehicle is a new energy vehicle, which may be a battery electric vehicle, or may be a hybrid electric vehicle or an extended-range electric vehicle. The vehicle body 2 is provided with a drive motor. The drive motor is electrically connected to the battery pack 1, and is provided with electrical energy by the battery pack 1. The drive motor is connected to wheels on the vehicle body 2 through a transmission mechanism to drive the vehicle. In some embodiments, the battery pack 1 may be horizontally disposed at the bottom of the vehicle body 2.

Figure 2:
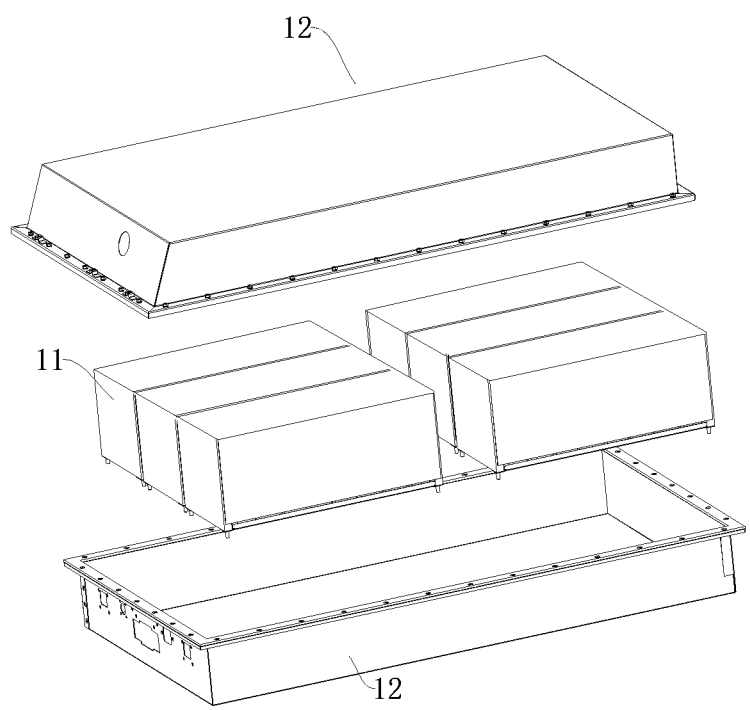
FIG. 2 is a schematic structural diagram of a battery pack according to an embodiment of this application.

Referring to FIG. 2, the battery pack 1 can be disposed in various ways. In some embodiments, the battery pack 1 includes a box body 12 and a battery module 11 disposed in the box body 12.

One or more battery modules 11 are provided, and a plurality of battery modules 11 are arranged in a line in the box body 12. The box body 12 is not limited in type and may be a frame-shaped, disk-shaped, or box-shaped box body, or the like. Specifically, the box body 12 may include a lower box body for accommodating the battery module and an upper box body that is engaged to the lower box body.

Figure 3:
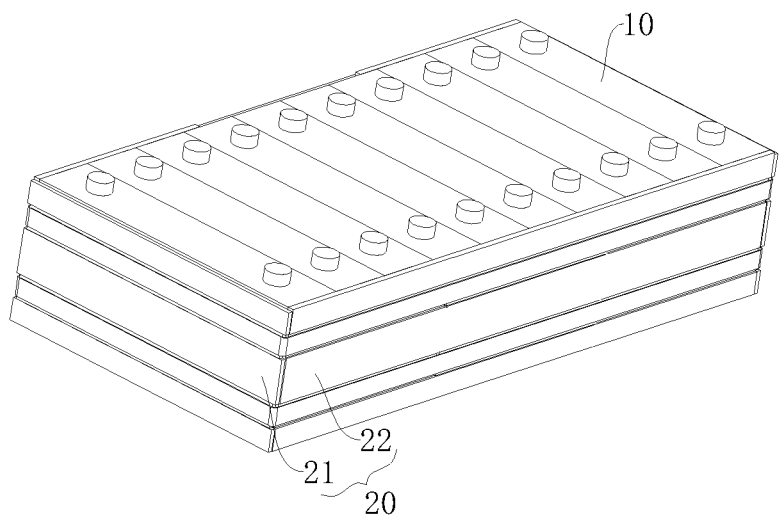
FIG. 3 is a schematic structural diagram of a battery module according to an embodiment of this application.

Referring to FIG. 3, the battery module 11 can be provided in various ways. In some embodiments, the battery module 11 includes an accommodating portion 20 and a plurality of battery cells 10 located in the accommodating portion 20, and the battery cells 10 are disposed side by side in the accommodating portion 20.

The accommodating portion 20 can be provided in various ways. For example, the accommodating portion 20 includes a housing and a cover plate covering the housing; or the accommodating portion 20 includes side plates 22 and end plates 21 that are successively connected to form an enclosure; or the accommodating portion 20 includes two opposite end plates 21 and a band surrounding the end plates 21 and the battery cells 10; or as shown in FIG. 3, the accommodating portion 20 includes side plates 22, end plates 21, and a band.

It can be understood that the battery cells 10 can be used in vehicles and other apparatuses. An embodiment of this application further provides an apparatus that uses battery cells 10 as a power source, where the apparatus may be, but is not limited to, a vehicle, a ship, or an aircraft.

Figure 4:
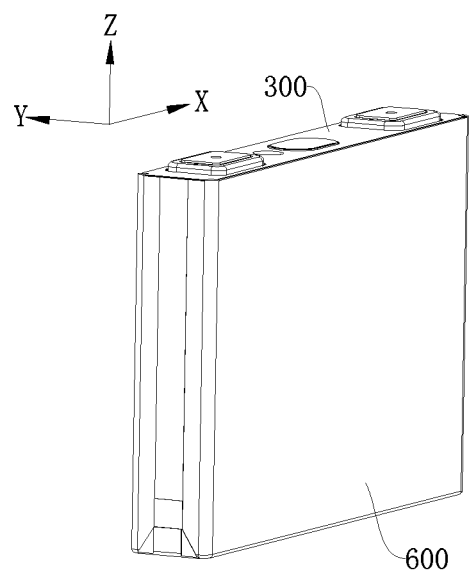
FIG. 4 is a schematic structural diagram of a battery cell according to an embodiment of this application.
Figure 5:
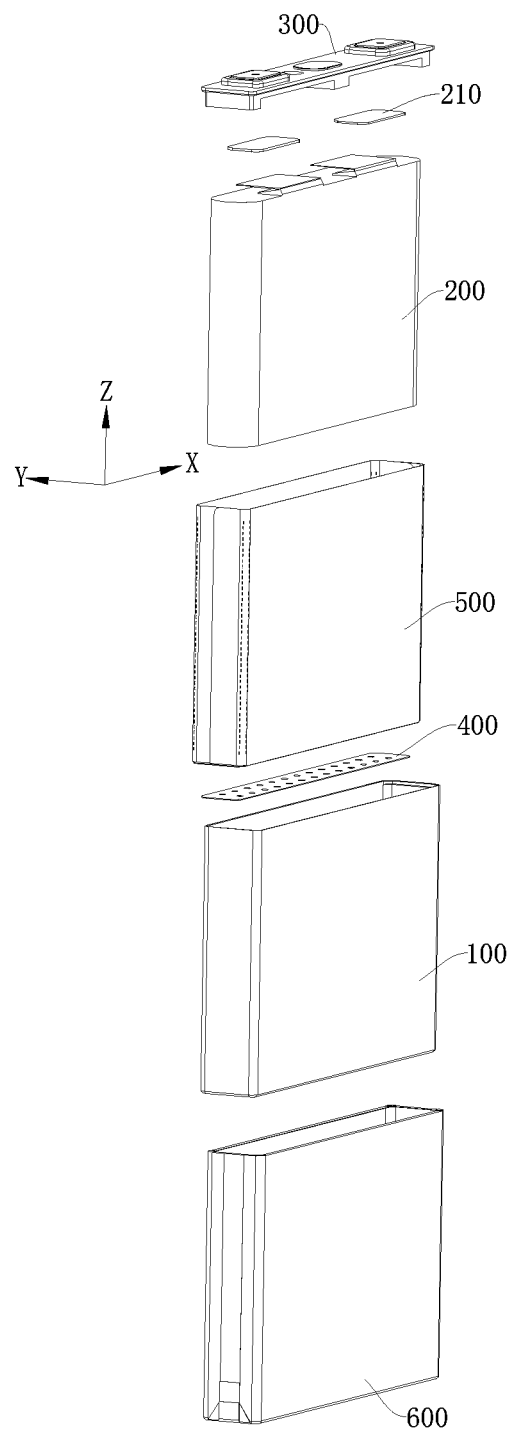
FIG. 5 is a schematic exploded view of a structure of a battery cell according to an embodiment of this application.

Referring to FIG. 4 and FIG. 5, the battery cell 10 includes, for example, a housing 100, an electrode unit 200 located in the housing 100, and a cover plate assembly 300 covering an opening of the housing 100. A connecting sheet 210 is further provided between the electrode unit 200 and the cover plate assembly 300. The housing 100 is further provided with a supporting plate 400 for supporting the electrode unit 200. In some embodiments, the electrode unit 200 is wrapped with an insulating sheet 500, so as to improve insulation performance between the electrode unit 200 and the housing 100. The housing 100 is wrapped with an insulating film 600, so as to improve insulation performance between the battery cells 10 and the accommodating portion 20.

Figure 6:
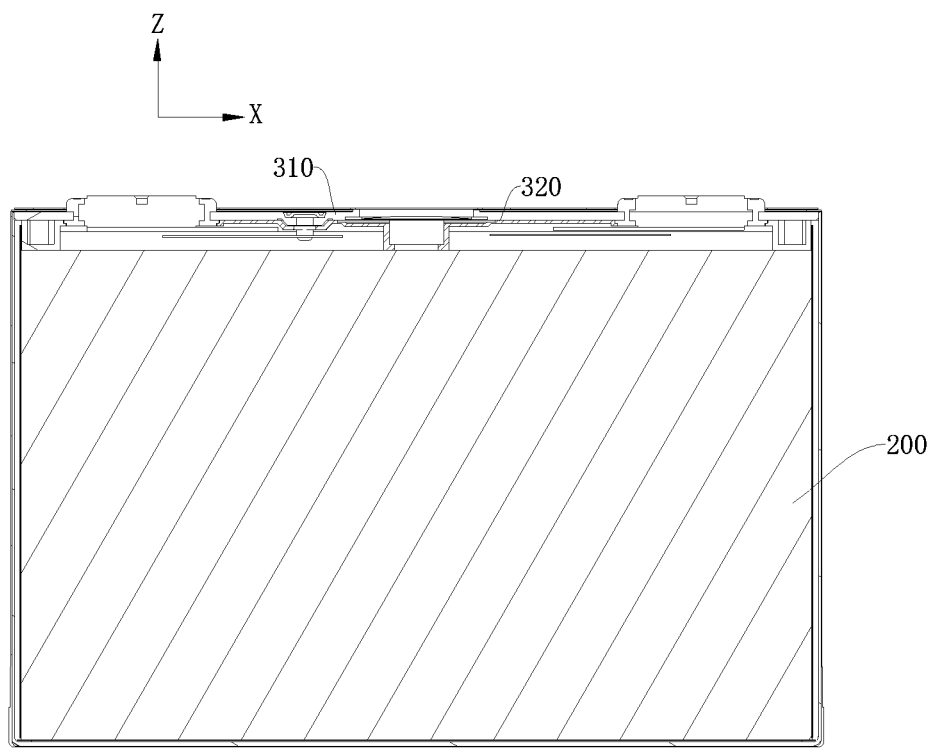
FIG. 6 is a cross-sectional view of a battery cell according to an embodiment of this application.
Figure 7:
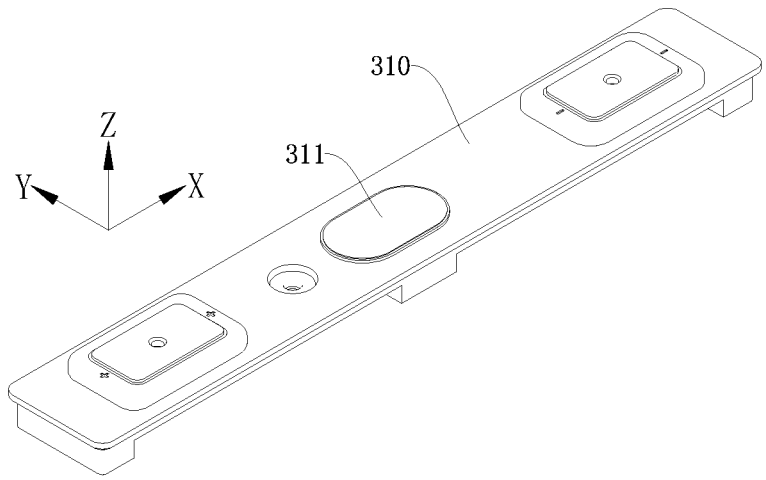
FIG. 7 is a schematic structural diagram of a top cover assembly according to an embodiment of this application.

Referring to FIG. 6 and FIG. 7, in some embodiments, the cover plate assembly 300 includes a top cover plate 310, where the top cover plate 310 is provided with an explosion-proof valve 311; and an insulating plate 320, where the insulating plate 320 is laminated with the top cover plate 310 and located on a side of the top cover plate 310 facing toward the electrode unit 200.

In order to ensure safety of the battery cells 10, the insulating plate 320 is provided with an exhaust passage 324 which has an exhaust through hole 324a. When the electrode unit 200 is not functioning properly and heats up so as to generate gas, the gas can be discharged through the exhaust through hole 324a to push the explosion-proof valve 311 open. However, a conventional insulating plate 320, which is typically provided with equal thickness, will be partially softened or even melted, reducing the effective exhaust area of the exhaust through hole 324a. As a result, the gas cannot push the explosion-proof valve 311 open in time, leaving the battery cells 10 at risk of explosion.

In view of this, in some embodiments of this application, the insulating plate 320 includes a base portion 321 and a thinned region 322 located in the base portion 321, the thinned region 322 is formed by thinning the base portion 321, and a region enclosed by boundaries of an orthographic projection of the thinned region 322 at least partially overlaps an orthographic projection of the explosion-proof valve 311 in a thickness direction of the cover plate assembly 300.

In the cover plate assembly 300 for a battery cell according to the embodiments of this application, the cover plate assembly 300 includes a top cover plate 310 and an insulating plate 320. The top cover plate 310 is provided with an explosion-proof valve 311, a base portion 321 of the insulating plate 320 is provided with a thinned region 322, and the thinned region 322 is formed by thinning the base portion 321. The thinned region 322 is easily softened and deformed by heat, making a through hole in the thinned region 322, thereby effectively increasing the exhaust area and ensuring normal and timely opening of the explosion-proof valve 311. A region enclosed by boundaries of an orthographic projection of the thinned region 322 at least partially overlaps an orthographic projection of the explosion-proof valve 311 in a thickness direction of the cover plate assembly 300, which means the thinned region 322 corresponds to a position of the explosion-proof valve 311 in the thickness direction, so that gas can quickly arrive at the explosion-proof valve 311 and then quickly push the explosion-proof valve 311 open, avoiding explosion caused by the explosion-proof valve 311 failing to be opened, and effectively improving safety performance of the battery cell.

The relative positions of the thinned region 322 and the explosion-proof valve 311 can be determined in various ways. For example, the region enclosed by the boundaries of the orthographic projection of the thinned region 322 completely overlaps the orthographic projection of the explosion-proof valve 311 in the thickness direction. When the thinned region 322 is heated and melted to form an exhaust hole, the gas can directly rush to the explosion-proof valve 311 through the exhaust hole, pushing the explosion-proof valve 311 open even faster.

Alternatively, in some other embodiments, the orthographic projection of the thinned region 322 is located within the orthographic projection of the explosion-proof valve 311 in the thickness direction, which can also increase the rate for the gas to push the explosion-proof valve 311 open.

In some other embodiments, the orthographic projection of the thinned region 322 is located at the periphery of the orthographic projection of the explosion-proof valve 311 in the thickness direction. During normal operation of the battery cells, the orthographic projection of the thinned region 322 is located at the periphery of the orthographic projection of the explosion-proof valve 311, and the thinned region 322 has a relatively small area, which can increase structural strength of the insulating plate 320.

When the battery cells are not functioning properly and heat up, the thinned region 322 is heated and deformed, and the gas can rush from the thinned region 322 to the explosion-proof valve 311, pushing the explosion-proof valve 311 open even faster. After the thinned region 322 is heated and deformed, a bonding force between the thinned region 322 and the base portion 321 is reduced. Under the impact of the pressure at the electrode unit 200, part of the base portion 321 enclosed by the thinned region 322 can be directly discharged from the explosion-proof valve 311; or when the temperature further rises and the thinned region 322 is completely melted, part of the base portion 321 enclosed by the thinned region 322 can fall off from the base portion 321, and can be directly discharged from the explosion-proof valve 311, further increasing the exhaust area and the rate of pressure relief for the battery cells, and ensuring safety performance of the battery cells.

The thinned region 322 can be formed in various ways, provided that the thinned region 322 is formed by thinning the base portion 321 and has a smaller thickness. For example, the thinned region 322 is hollowed in the thickness direction.

In some embodiments, the insulating plate 320 includes two surfaces disposed opposite each other in the thickness direction, and the thinned region 322 includes a groove 322a formed by at least one of the two surfaces being recessed.

Figure 8:
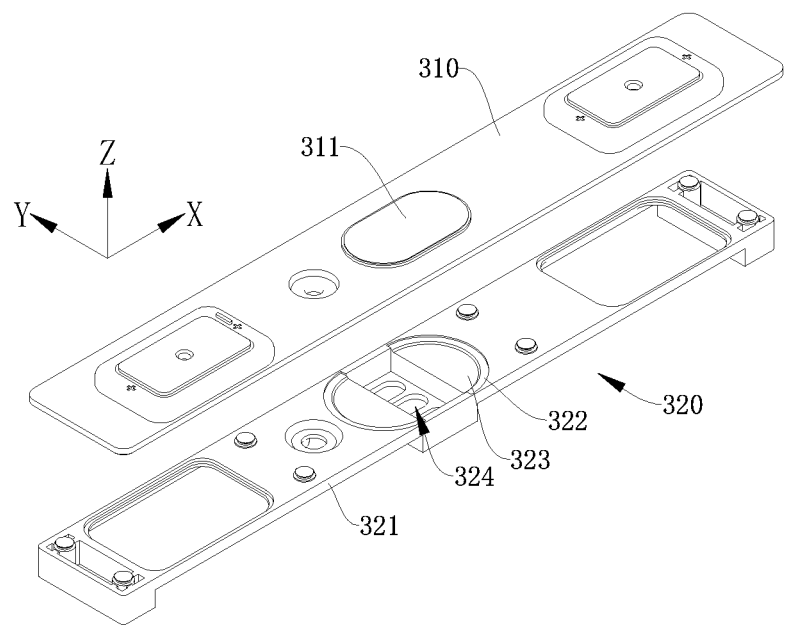
FIG. 8 is a schematic exploded view of a structure of a top cover assembly according to an embodiment of this application.
Figure 9:
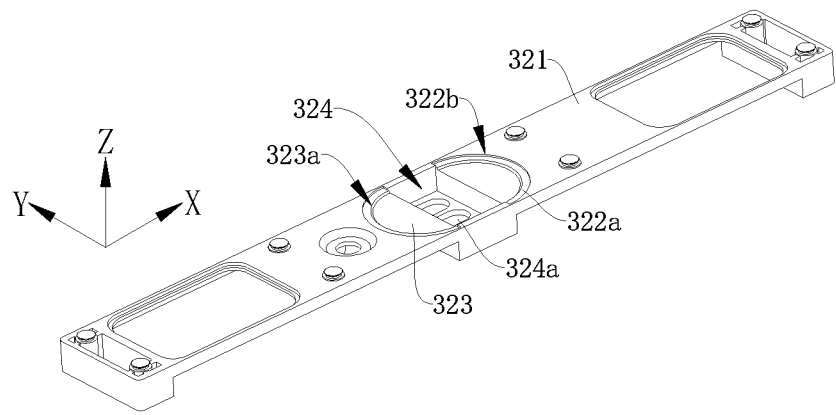
FIG. 9 is a schematic structural diagram of an insulating plate of a top cover assembly according to an embodiment of this application.

Referring to FIG. 8 and FIG. 9, in some embodiments, the insulating plate 320 includes a recess portion 323, where the recess portion 323 is formed by the base portion 321 being recessed in a direction away from the top cover plate 310, and is disposed corresponding to the explosion-proof valve 311 in the thickness direction; and the groove 322a is disposed on the periphery of the recess portion 323.

In these embodiments, the insulating plate 320 is provided with the recess portion 323 corresponding to the explosion-proof valve 311, and the groove 322a is located at the periphery of the recess portion 323. When the groove 322a is deformed or even melted by heat, the recess portion 323 and the base portion 321 can be detached from each other. The recess portion 323 is disposed corresponding to the explosion-proof valve 311, so the recess portion 323 can be discharged from the explosion-proof valve 311, thereby further increasing the exhaust area and the rate of pressure relief of the battery cells, and ensuring safety performance of the battery cells.

The recess portion 323 is not limited in size. For example, an area of an orthographic projection of the recess portion 323 is equal to an area of an orthographic projection of the explosion-proof valve 311 in the thickness direction. In some other embodiments, when the explosion-proof valve 311 is welded to the top cover plate 310 and a welding mark is formed, the area of the orthographic projection of the recess portion 323 is larger than that of the explosion-proof valve 311 in the thickness direction. In some embodiments, the area of the orthographic projection of the recess portion 323 is equal to the area of the orthographic projections of the explosion-proof valve 311 and the welding mark, so that the recess portion 323 can give way to the welding mark, preventing the base portion 321 from coming into touch with the explosion-proof valve 311 or the welding mark to affect the valve opening pressure.

The recess portion 323 can be disposed in various shapes. In some embodiments, a shape of the recess portion 323 matches a shape of the explosion-proof valve 311. The shape of the recess portion 323 matches the shape of the explosion-proof valve 311, which may be, for example, that the recess portion 323 has the same outer edge shape as the explosion-proof valve 311, or that the recess portion 323 has an outer edge shape similar to that of to the explosion-proof valve 311, provided that the recess portion 323 can give way to the welding mark formed by welding the explosion-proof valve 311 to the top cover plate 310.

The groove 322a can be disposed in various ways. For example, the groove 322a is formed by extending around an outer circumference of the recess portion 323. To be specific, the groove 322a is integrally formed and is disposed around the recess portion 323. Alternatively, in some other embodiments, the groove 322a includes more than two sub-grooves 322a which are spaced apart along an outer circumference of the recess portion 323.

As shown in FIG. 8, in some embodiments, the insulating plate 320 further includes an exhaust passage 324, and an exhaust through hole 324a is disposed at the bottom of the exhaust passage 324; two recess portions 323 are provided, and are located on two sides of the exhaust passage 324 in a length direction of the insulating plate 320; and two grooves 322a are provided, and are respectively located on sides of the two recess portions 323 facing away from the exhaust passage 324.

For example, the groove 322a is integrally formed. The grooves 322a are integrally formed on the sides of the recess portions 323 facing away from the exhaust passage. Alternatively, the groove 322a includes a plurality of sub-grooves 322a which are spaced apart on the side of the recess portion 323 facing away from the exhaust passage. Alternatively, of the two grooves 322a, one is integrally formed, and the other includes a plurality of sub-grooves 322a.

In some other embodiments, the recess portion 323 is a closed shape, that is, an extension length of the recess portion 323 in a width direction is less than an extension length of the base portion 321 in the width direction, on which the groove 322a is integrally formed on an outer edge of the recess portion 323, or the groove 322a includes more than two sub-grooves 322a which are spaced apart around the outer edge of the recess portion 323.

Figure 10:
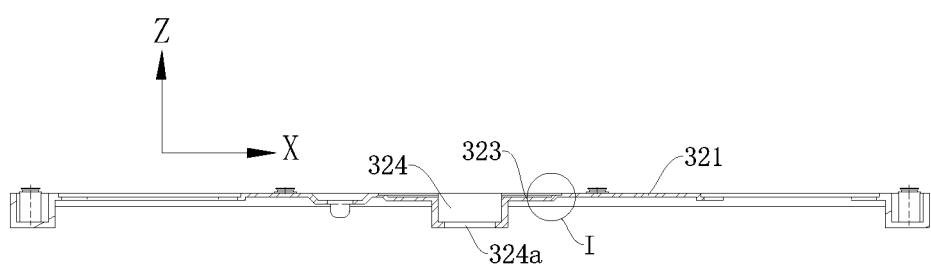
FIG. 10 is a cross-sectional view of an insulating plate of a top cover assembly according to an embodiment of this application.
Figure 11:
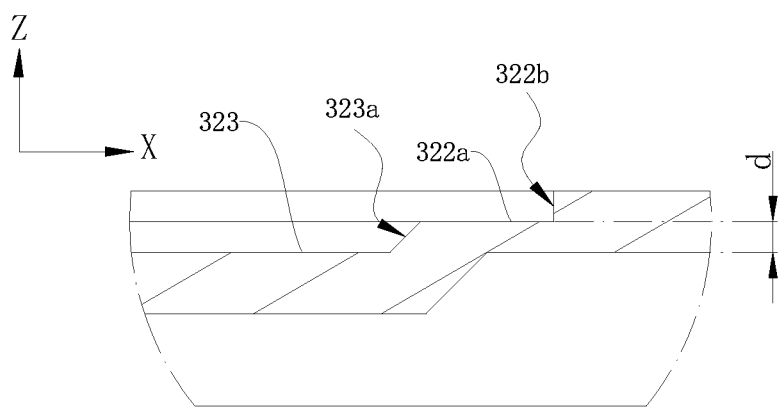
FIG. 11 is a partial enlarged view of the structure at position I in FIG. 10.

Referring to FIG. 10 and FIG. 11, the groove 322a can be disposed in various shapes. In some embodiments, the recess portion 323 includes a first arc-shaped outer edge 323a; and the groove 322a is formed by the first arc-shaped outer edge 323a extending along a direction away from the recess portion 323, a second arc-shaped outer edge 322b is formed on a side of the groove 322a facing away from the recess portion 323, and the groove 322a is distributed as an arc-shaped strip.

In these embodiments, the groove 322a is distributed as an arc-shaped strip, and is formed by the first arc-shaped outer edge 323a of the recess portion 323 extending along a direction away from the recess portion 323. A shape of the groove 322a matches a shape of the relief recess 323, and the groove 322a is disposed adjacent to the recess portion 323. When the groove 322a is deformed or even melted by heat, the recess portion 323 located in an enclosed region of the groove 322a can be detached from a base body and discharged from the explosion-proof valve 311.

A distance between the groove 322a and the recess portion 323 can be set in various ways. In some embodiments, the minimum distance from an edge of the groove 322a facing toward the recess portion 323 to the recess portion 323 is 0 mm to 3 mm, making the groove 322a closer to the recess portion 323. When the groove 322a is deformed or even melted by heat, the recess portion 323, or the recess portion 323 and other parts of the base portion 321 with a very limited area around the recess portion 323 are detached from the base portion 321. This avoids that a part detached when the groove 322a is softened, deformed, or even melted by heat is too large to be discharged from the explosion-proof valve 311 or even blocks the exhaust through hole.

The groove 322a can be disposed in various sizes. In some embodiments, the minimum distance from an edge of the groove 322a facing away from the recess portion 323 to an edge of the groove 322a facing toward the recess portion 323 is 0.8 mm to 3 mm. In these embodiments, when the groove 322a is within the above size range, the following issues can be avoided: the exhaust hole formed by melting and deformation of the groove 322a has an extremely small area; the recess portion 323 fails to be detached from the base portion 321; and the part detached when the groove 322a is softened and deformed or even melted by heat is too large to be discharged from the explosion-proof valve 311.

After the base portion 321 is thinned to form the groove 322a, a residual thickness d of the base portion 321 corresponding to the groove 322a is, for example, 0.2 mm to 4 mm, that is, the residual thickness d at the bottom of the groove 322a is 0.2 mm to 4 mm in the thickness direction. The residual thickness d refers to the thickness remaining after part of the base portion 321 is thinned in the thinned region 322. When the residual thickness d at the bottom of the groove 322a is within the above range, the following issues can be avoided: the groove 322a is not easily deformed or melted by heat due to its thick bottom; and the insulation plate 320 has an extremely low strength due to the excessively thin bottom of the groove 322a, and is prone to damage or deform during normal use.

This application can be implemented in other specific forms without departing from its spirit and essential features. For example, the algorithm described in a specific embodiment can be modified while the system architecture does not depart from the basic spirit of this application. Therefore, the current embodiments are regarded as illustrative rather than limitative in all aspects, and the scope of this application is defined by the appended claims rather than the foregoing description, and all changes falling within the meaning of the claims and their equivalents are thereby included within the scope of this application.

What is claimed is:

1. A cover plate assembly for a battery cell, wherein the cover plate assembly comprises:
    a top cover plate, wherein the top cover plate is provided with an explosion-proof valve; and
    an insulating plate, laminated with the top cover plate, wherein the insulating plate comprises a base portion and a thinned region located in the base portion, the thinned region is formed by thinning the base portion, and in a thickness direction of the cover plate assembly, a region enclosed by boundaries of an orthographic projection of the thinned region at least partially overlaps an orthographic projection of the explosion-proof valve;
    wherein the insulating plate comprises two surfaces disposed opposite each other in the thickness direction, and the thinned region comprises a groove formed by at least one of the two surfaces being recessed;
    the insulating plate comprises a recess portion, and the recess portion is formed by the base portion being recessed in a direction away from the top cover plate, and is disposed corresponding to the explosion-proof valve in the thickness direction; and
    the groove is disposed on the periphery of the recess portion, the thickness of the insulating plate at the thinned region is smaller than the thickness of the insulating plate at the recess portion.

2. The cover plate assembly according to claim 1, wherein an area of an orthographic projection of the recess portion is greater than or equal to an area of the orthographic projection of the explosion-proof valve in the thickness direction.

3. The cover plate assembly according to claim 1, wherein the groove is formed by extending around an outer circumference of the recess portion; or
    the groove comprises more than two sub-grooves which are spaced apart along an outer circumference of the recess portion.

4. The cover plate assembly according to claim 1, wherein a shape of the recess portion matches a shape of the explosion-proof valve.

5. The cover plate assembly according to claim 1, wherein the recess portion comprises a first arc-shaped outer edge; and
    the groove is formed by the first arc-shaped outer edge extending along a direction away from the recess portion, a second arc-shaped outer edge is formed on a side of the groove facing away from the recess portion, and the groove is distributed as an arc-shaped strip.

6. A battery cell, comprising:
    a housing and an electrode unit located in the housing; and
    the cover plate assembly according to claim 1, wherein the cover plate assembly covers an opening of the housing, and the insulating plate is located on a side of the cover plate facing toward the electrode unit.

7. A battery module, comprising the battery cell according to claim 6.

8. A battery pack, comprising the battery module according to claim 7.

9. An apparatus that uses a battery cell as a power source, wherein the battery cell is the battery cell according to claim 8.

* * * * *